United States Patent
Thompson et al.

(10) Patent No.: US 11,168,756 B2
(45) Date of Patent: Nov. 9, 2021

(54) MOUNTING

(71) Applicant: PUMPKIN MOUNTS, LLC, New York, NY (US)

(72) Inventors: Phillip R. Thompson, Fife (GB); Nicolas K. Misselbrook, Fife (GB)

(73) Assignee: PUMPKIN MOUNTS, LLC, New York, NY (US)

( * ) Notice: Subject to any disclaimer, the term of this patent is extended or adjusted under 35 U.S.C. 154(b) by 0 days.

(21) Appl. No.: 16/816,919

(22) Filed: Mar. 12, 2020

(65) Prior Publication Data
US 2020/0217385 A1 Jul. 9, 2020

Related U.S. Application Data

(63) Continuation of application No. 15/566,348, filed as application No. PCT/GB2016/050989 on Apr. 8, 2016, now Pat. No. 10,591,012.

(30) Foreign Application Priority Data

Apr. 15, 2015 (GB) .................................... 1506395
May 12, 2015 (GB) .................................... 1508093

(51) Int. Cl.
*F16M 7/00* (2006.01)
*F16F 3/02* (2006.01)
(Continued)

(52) U.S. Cl.
CPC ................ *F16F 3/023* (2013.01); *B60P 1/64* (2013.01); *B65D 90/14* (2013.01); *F16F 1/187* (2013.01); *F16F 1/20* (2013.01); *F16F 1/30* (2013.01); *F16F 1/40* (2013.01); *F16F 1/426* (2013.01); *F16F 3/02* (2013.01); *F16F 3/12* (2013.01);
(Continued)

(58) Field of Classification Search
None
See application file for complete search history.

(56) References Cited

U.S. PATENT DOCUMENTS 6,740 A 9/1849 Warren
3,968,958 A * 7/1976 Huchette ............... B29C 70/345
267/47

(Continued)

FOREIGN PATENT DOCUMENTS

EP 0132048 A1 1/1985
EP 0296974 A1 12/1988
(Continued)

OTHER PUBLICATIONS

International Search Report for PCT/GB2016/050989 dated Jul. 27, 2016, 5 pages.
(Continued)

*Primary Examiner* — Monica E Millner
(74) *Attorney, Agent, or Firm* — Arent Fox LLP (57) ABSTRACT

An improved shock isolating mounting comprising at least three substantially U-shaped leaf spring members, each leaf spring member comprising at least two leafs arranged to define a space therebetween. In one arrangement, the respective at least three substantially U-shaped leaf spring members are arranged in an array having a substantially equal angular spacing between adjacent spring members.

23 Claims, 7 Drawing Sheets

(51) Int. Cl.
  *F16F 15/08* (2006.01)
  *F16F 1/18* (2006.01)
  *F16F 3/12* (2006.01)
  *F16F 1/40* (2006.01)
  *F16F 1/42* (2006.01)
  *B60P 1/64* (2006.01)
  *B65D 90/14* (2006.01)
  *F16F 1/20* (2006.01)
  *F16F 1/30* (2006.01)
  *F16M 5/00* (2006.01)
  *B60P 7/16* (2006.01)
  *B63B 25/28* (2006.01)

(52) U.S. Cl.
  CPC ............ *F16F 15/085* (2013.01); *F16M 5/00* (2013.01); *F16M 7/00* (2013.01); *B60P 1/6409* (2013.01); *B60P 7/16* (2013.01); *B63B 25/28* (2013.01); *B63B 2025/285* (2013.01); *F16F 2224/025* (2013.01); *F16F 2224/0208* (2013.01); *F16F 2230/0005* (2013.01); *F16F 2230/24* (2013.01); *F16F 2236/025* (2013.01); *F16M 2200/08* (2013.01)

(56) References Cited

U.S. PATENT DOCUMENTS

| | | | |
|---|---|---|---|
| 4,688,778 A * | 8/1987 | Woltron | B29C 43/32 267/148 |
| 5,042,783 A | 8/1991 | Hutchinson | |
| 5,390,891 A | 2/1995 | Hornung et al. | |
| 5,522,214 A | 6/1996 | Beckett et al. | |
| 6,050,556 A | 4/2000 | Masuda et al. | |
| 6,427,990 B1 | 8/2002 | Hartmann | |
| 6,461,455 B1 * | 10/2002 | Meatto | B29C 35/0272 156/273.7 |
| 10,591,012 B2 * | 3/2020 | Thompson | F16F 3/023 |
| 2009/0279998 A1 | 11/2009 | Fukuda | |
| 2014/0048988 A1 | 2/2014 | Soles et al. | |
| 2016/0102724 A1 | 4/2016 | Potter et al. | |
| 2017/0313149 A1 | 11/2017 | Chihara et al. | |

FOREIGN PATENT DOCUMENTS

| | | |
|---|---|---|
| EP | 0566436 A1 | 10/1993 |
| GB | 1057750 A | 2/1967 |
| GB | 2330642 A | 4/1999 |
| JP | 2006207637 A | 8/2006 |
| JP | 2011127384 A | 6/2011 |

OTHER PUBLICATIONS

International Preliminary Report on Patentability and Written Opinion of the International Searching Authority issued for PCT/GB2016/050989, dated Oct. 17, 2017.

* cited by examiner

MOUNTING

CROSS-REFERENCE TO RELATED APPLICATIONS

This application is a continuation of application Ser. No. 15/566,348, filed Oct. 13, 2017, which is a U.S. National Stage Application of International Patent Application No. PCT/GB2016/050989, filed on Apr. 8, 2016, which claims priority to GB Application No. 1506395.1, filed on Apr. 15, 2015 and GB Application No. 1508093.0 filed on May 12, 2015, the contents of each of which is incorporated herein by reference in its entirety.

FIELD OF THE INVENTION

The present invention relates to an improved mounting adapted to isolate shocks and to reduce the acceleration of items supported by such a mounting.

BACKGROUND TO THE INVENTION

Many industrial applications require the use of shock and vibration isolators to protect installations, machinery and equipment from hostile environments. One of the most challenging environments is on naval ships where it is customary for systems, machinery and equipment to be required to withstand a specific shock and vibration environment imposed by underwater explosive attack and the rigours of naval service. To provide protection of critical or vulnerable systems it is customary to use shock mounts or isolators to perform the function of reducing the acceleration imparted to the mounted item while also controlling displacement within acceptable levels. It is also a requirement to assure the captivity of the mounted item to a specified shock input to prevent it breaking loose and posing a hazard to the crew and other ship systems.

GB 1,057,750 discloses a shock mount that is commonly referred to as an "X type" shock mount. This "X type" mount is a naval shock mount comprising a collection of two or three oval shaped stainless steel bands arranged to form a compound leaf spring, with a viscous damping compound located between the adjacent steel bands to provide constrained layer damping. Two of such leaf springs are arranged in an opposing end to end configuration to create a mount that takes the form of a continuous band. The mount works as a compliant member between an item supported on the mount and the ship deck, bulkhead or equipment foundation, and has its damping controlled by the constrained layer damping material provided between the adjacent steel bands of each leaf spring. Mounts of this type has been in service for fifty years and continue to be used by many navies worldwide.

A more recent innovation to the "X type" mount is disclosed in GB 2 330 642 A whereby a steel mesh is used as the damping medium between the adjacent steel bands of the leaf springs.

At higher levels of shock loading the "X type" mount will further dissipate the shock loading by yielding of the leaf spring members. This highly effective mount type comes in a range of sizes to support masses from 10 kg upwards. The largest available mount in the range will support a mass up to 550 kg. One drawback of this type of mount is that due to their shape, they have a characteristic stiffness and natural frequency in the lateral direction that is asymmetric, with the stiffness in lateral direction along the long axis of the mount being typically one third of that in the lateral direction transversely across the mount.

In practice, this means that where equal stiffness and/or damping is required in both lateral and longitudinal directions, a number of separate mounts are required to be used between an object to be supported and the underlying support surface with the lateral and longitudinal axes of adjacent mounts being oriented orthogonally to one another.

A further drawback of the prior art mounts is that when a mount is pre-loaded at the upper extremity of the advertised supported mass range for a given mount size, and is then subjected to very high shock loads or such loads that may be imposed by the high displacement, low frequency loads characterised by the phenomenon of ship hull girder whipping, there is a risk that the mount will "bottom out". Bottoming in this context is caused by closure of the gap between the mounts respective upper and lower securing bolts, resulting in the bolts contacting with metal-to-metal impact which in turn imposes high accelerations on to the supported item It is therefore an object of the present invention to provide an improved mount that mitigates the disadvantages of the prior art mounts.

SUMMARY OF THE INVENTION

In accordance with one aspect of the invention, there is provided a mount comprising at least three substantially U-shaped leaf spring members, each leaf spring member comprising at least two leafs arranged to define a space therebetween.

Preferably, the respective at least three substantially U-shaped leaf spring members are arranged in an array having a substantially equal angular spacing between adjacent spring members.

In this way, where a whole number n of U-shaped leaf spring members are employed, n being at least three, adjacent spring members are separated by an angle that is substantially 360°/n In one arrangement, a mount comprises three substantially U-shaped leaf spring members.

In one arrangement, a mount comprises four substantially U-shaped leaf spring members.

It will be appreciated that a mount may comprise three or more substantially U-shaped leaf spring members.

Optionally, each leaf spring member comprises two leafs arranged to define a space therebetween.

Optionally, each leaf spring member comprises three leafs arranged to define a space therebetween.

Preferably, each leaf is formed from a band of stainless steel.

Optionally, the space defined by adjacent leafs of a leaf spring member which is filled with a damping material.

Optionally, the damping material comprises a viscoelastic damping compound.

Optionally, the damping material comprises a wire mesh.

Conveniently, each leaf spring member has an upper and lower end in use, the upper and lower ends representing respective terminal ends of each leaf spring member.

Conveniently, the respective terminal ends of adjacent leaf spring members are interleaved.

Conveniently, the leafs at the respective terminal ends of adjacent leaf spring members are interleaved.

Conveniently, the respective interleaved leafs are connected together via bolts which engage with locking nuts which extend through closure plates provided at either side of the respective upper and lower ends of said leaf spring members.

Advantageously, the use of locking nuts prevents loosening of the bolts in service and operation of the mounts particularly in high vibration environments.

Advantageously, interleaving of the respective upper and lower of adjacent leaf spring members obviates the need to provide face plates between the adjacent leafs at the terminal end of each leaf spring member.

Conveniently, each leaf spring member is provided with a recessed portion at its respective terminal ends, the respective recessed portions being such that when the leaf spring members are interleaved, the respective recessed portions come into proximity with each other to define apertures at the top and bottom of the mount.

Advantageously, the apertures are substantially concentric.

Conveniently, the closure plates are each provided with a corresponding aperture that is in coaxial alignment with the apertures at the top and bottom of the mount.

Conveniently, mounts are further provided with inserts each having a shoulder that is adapted to extend at least partially into a respective aperture at the top and bottom of the mount. Advantageously, the shoulders of the insert prevent the leafs of the leaf spring members from making direct contact with the respective shanks of mount securing bolts which extend through the respective apertures at the top and bottom of the mount.

Preferably, the insert is made from a polymer such as nylon.

Optionally, mounts in accordance with the invention are further provided with means to protect the mount securing bolts in the event of mount bottoming, i.e. over-closure of the mount in compression, whereby the heads of the mount securing bolts clash together.

Conveniently, the means to protect the mount securing bolts comprises a cap formed from a resilient material that is adapted to be fitted over each of the respective mounting bolt heads.

Optionally the cap is formed from rubber and preferably of not more than 60 shore hardness.

Conveniently, the cap is formed having side walls adapted to engage with a mounting bolt head, and a bulbous dome which defines an air gap between the dome and the bolt head in use.

Advantageously, the air gap allows for deformation of the cap before the cap material stiffens as it is compressed in use. Conveniently, caps reduce the high frequency accelerations transmitted above the mount which would otherwise ensue during metal-to-metal contact of clashing bolt heads.

In accordance with an aspect of the invention, there is provided a mount assembly comprising a plurality of mounts arranged between spaced apart upper and lower in use mount rails.

Preferably, each mount rail comprises a welded steel transverse beam to which the mounts are attached at their respective upper and lower ends by means of mount securing bolts and threaded nuts.

Conveniently, the lower mount rail is provided with a means of fixing said rail to the deck of a vessel or vehicle or other supporting surface.

Optionally, the lower mount rail comprises interface pads which are disposed at each end of said mount rail and which are adapted to bolt to supporting surface, for example, the deck of a vessel or vehicle.

Optionally, the lower mount rail comprises twistlocks which are disposed at each end of said mount rail and which are adapted to engage with a respective complementary aperture provided on a supporting surface, for example, the deck of a vessel or vehicle.

Conveniently, the upper mount rail spans the width of the mounting rail assembly and is provided at each end with a twistlock.

Advantageously, each twistlock of the upper mount rail is adapted to engage with a complementary casting provided on the item to be supported, for example the corner castings of an ISO container. In this way, the mounting rail assembly is particularly adapted to support intermodal or ISO containers, containerised items or apparatuses comprising ISO castings adapted to receive twistlocks.

Various examples and aspects of the invention will now be described in detail with reference to the accompanying figures. Still other aspects, features, and advantages of the present invention are readily apparent from the entire description thereof, including the figures, which illustrate a number of exemplary aspects and implementations. The invention is also capable of other and different aspects and implementations, and its several details can be modified in various respects, all without departing from the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

It will be appreciated that the noun "mount" may be interchangeably used with the noun "mounting" to describe the mounting devices of the invention described and claimed herein.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

All singular forms of members, or any other components described herein are understood to include plural forms thereof and vice versa.

BRIEF DESCRIPTION OF THE DRAWINGS

Embodiments of the present invention will now be described by way of example only and with reference to the accompanying drawings in which:—

FIG. 3 is an exploded view of the mount of FIG. 2a;

DESCRIPTION OF THE PREFERRED EMBODIMENTS

Figure 1:
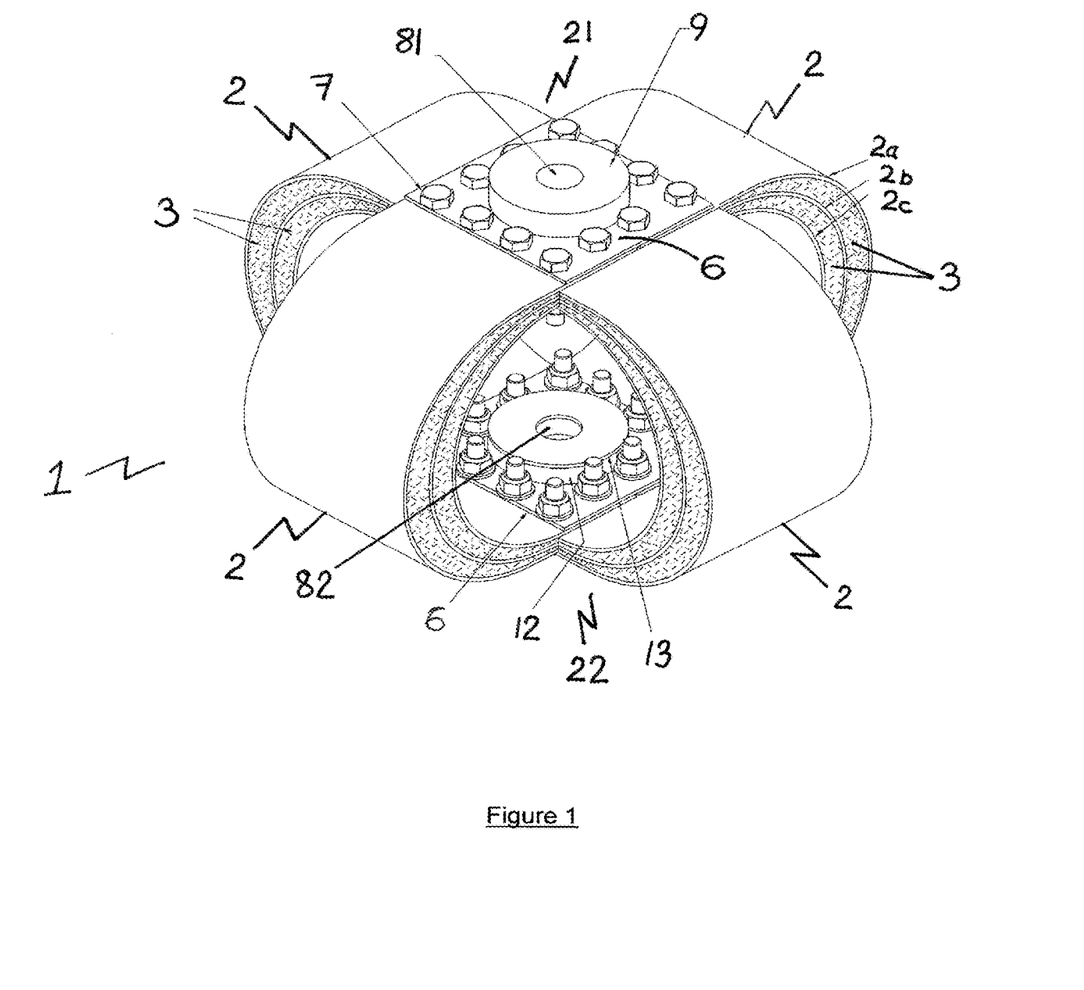
FIG. 1 is a schematic perspective view of an exemplary mount comprising four substantially U-shaped leaf spring members.
Figure 2:
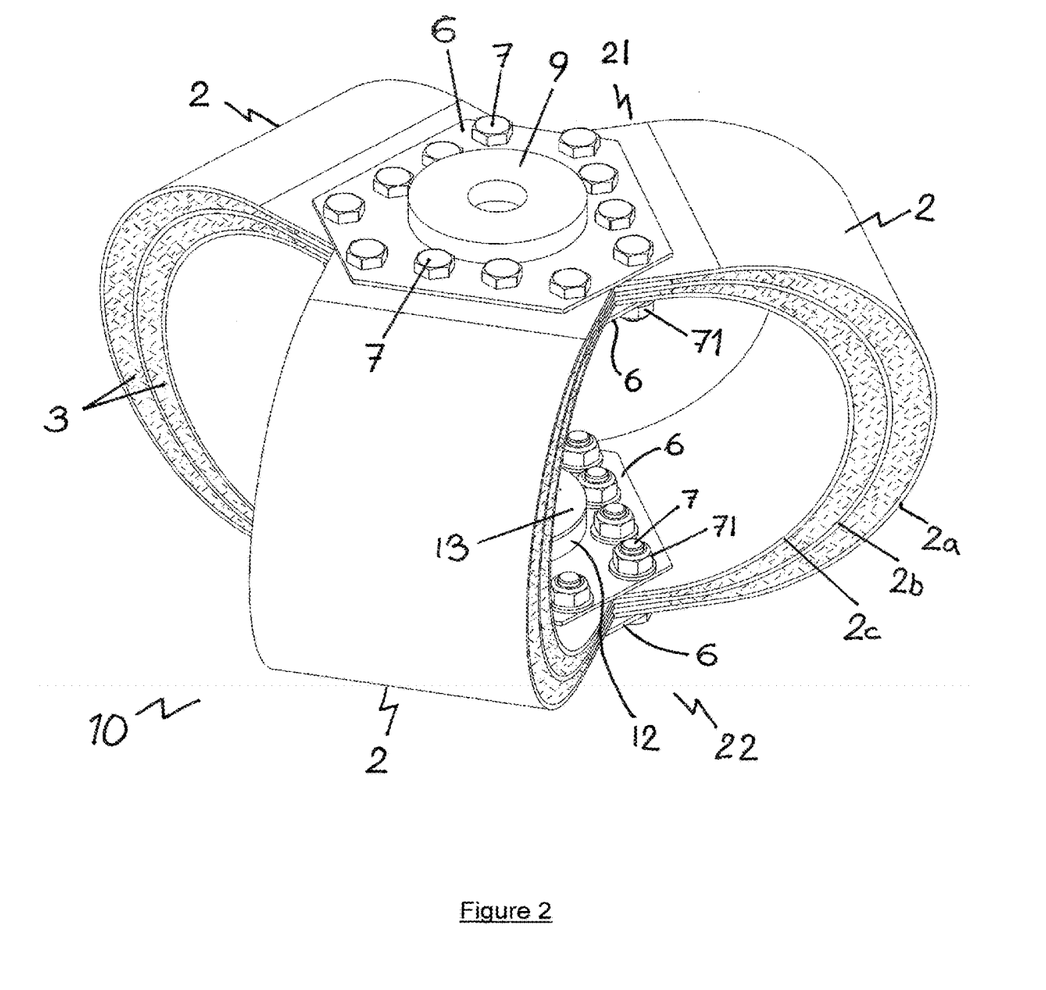
FIG. 2 is a schematic perspective view of an exemplary mount comprising three substantially U-shaped leaf spring members.
Figure 3:
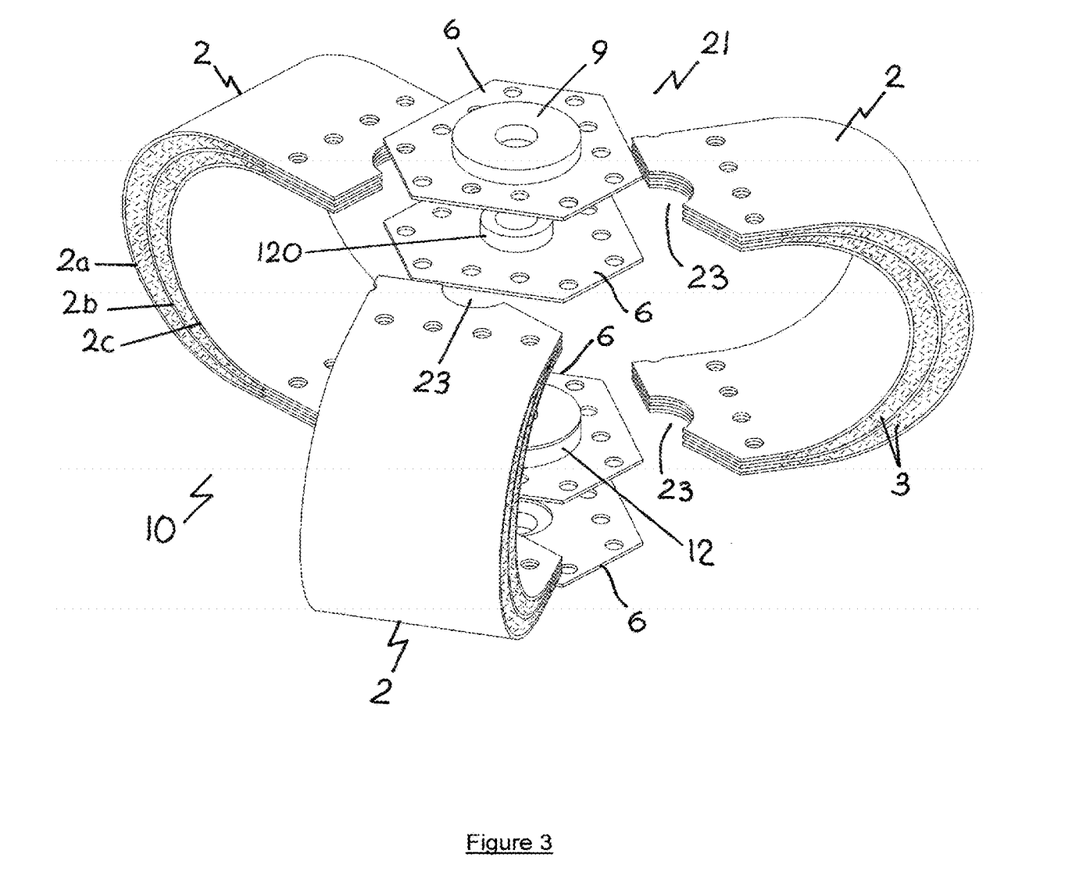

Referring to FIG. 1 there is shown an exemplary mount 1 comprising four substantially U-shaped leaf spring members 2. Referring to FIGS. 2 and 3, there is shown an exemplary mount 10 comprising three substantially U-shaped leaf spring members 2.

Each leaf spring member 2 is formed from at least two leafs. In FIGS. 1, 2 and 3, each leaf spring member is shown having three leafs 2*a*, 2*b*, 2*c*. Preferably, each leaf 2*a*, 2*b*, 2*c* is formed from a band of stainless steel, however any suitable material may be used. Between respective adjacent leafs 2*a*, 2*b*, 2*c* there is defined a space 3 which is filled with a viscoelastic damping compound. Alternatively, space 3 may be filled with a wire mesh damping material.

With reference to FIG. 3, each leaf spring member 2 has an upper 21 and lower 22 end in use. The upper and lower ends represent respective terminal ends of each leaf spring member 2. As shown in FIGS. 1 and 2, the respective adjacent leaf spring members 2 of a mount 1, 10 are interleaved at their respective upper 21 and lower 22 ends to form a three dimensional structure, with the respective interleaved leafs 2*a*, 3*b*, 2*c* being connected together via bolts 7 which engage with locking nuts 71 which extend through closure plates 6 located at either side of the respective upper 21 and lower 22 ends. The use of locking nuts 71, for example Nyloc nuts, prevents loosening of the bolts 7 in service and operation of the mount 1, 10, particularly in high vibration environments. It will be appreciated that this arrangement of interleaving leafs also applies to mounts having any number of U-shaped leaf spring members 2.

Interleaving of the respective upper 21 and lower 22 ends of adjacent leaf spring members 2 obviates the need to provide face plates between the adjacent leafs 2*a*, 2*b*, 2*c* at the terminal end of each leaf spring member. Face plates of prior art mount are indicated by reference numeral 30 in FIG. 5.

With reference to FIG. 3, the leafs 2*a*, 3*b*, 2*c* of each leaf spring member 2 are provided with a recessed portion 23 at their respective terminal ends. The respective recessed portions 23 are such that when the leaf spring members 2 are interleaved as described previously, the respective recessed portions 23 come into proximity with each other to define an aperture 81 (FIG. 1) at the top of the mount 1, and an aperture 82 (FIG. 1) bottom of the mount 1, 10. Apertures 81 and 82 are substantially concentric. Closure plates 6 are each provided with a corresponding aperture that is in coaxial alignment with apertures 81, 82. It will be appreciated that this arrangement of recessed portions defining apertures applies to mounts having any number of U-shaped leaf spring members 2.

Where four substantially U-shaped leaf spring members 2 are employed in a mount (e.g. mount 1 shown in FIG. 1) adjacent spring members are separated by an angle that is substantially 90°. In this way, the adjacent spring members are arranged substantially orthogonally with each other. When viewed from above or below, such a mount is substantially cruciform in shape.

Where three substantially U-shaped leaf spring members 2 are employed in a mount (e.g. mount 10 shown in FIGS. 2 and 3) adjacent spring members are separated by an angle that is substantially 120°.

In summary, where a number n of U-shaped leaf spring members 2 are employed, adjacent spring members are separated by an angle that is substantially 360°/n.

Figure 4:
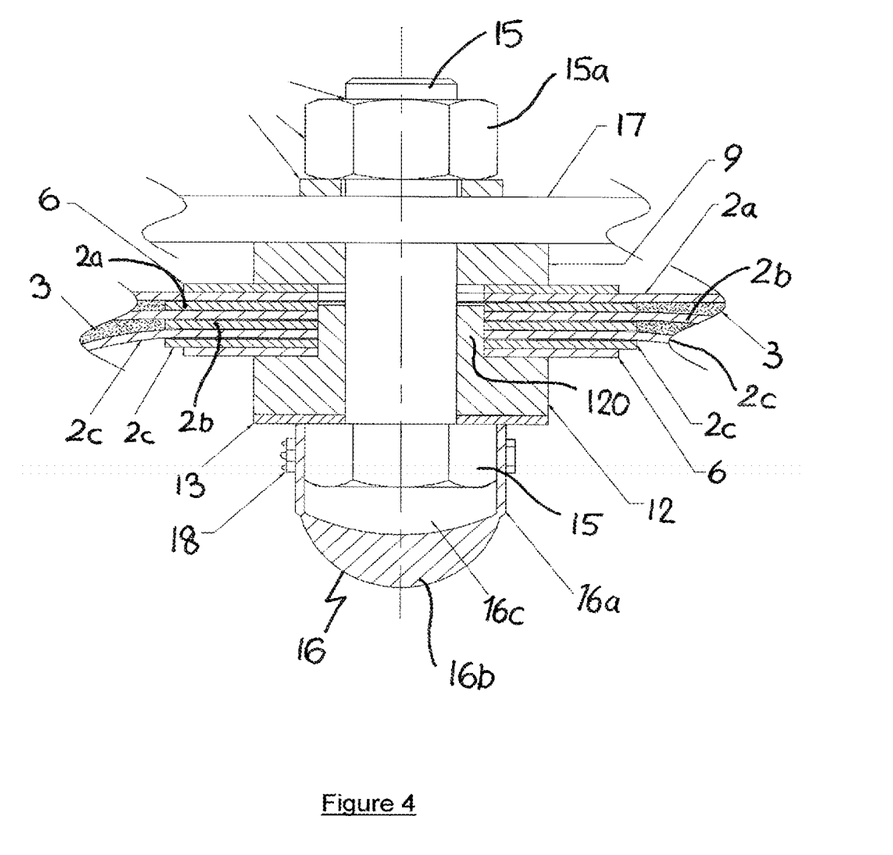
FIG. 4 is a detailed illustration showing the interleaving assembly of a mount and a bump stop in accordance with the invention.
Figure 6:
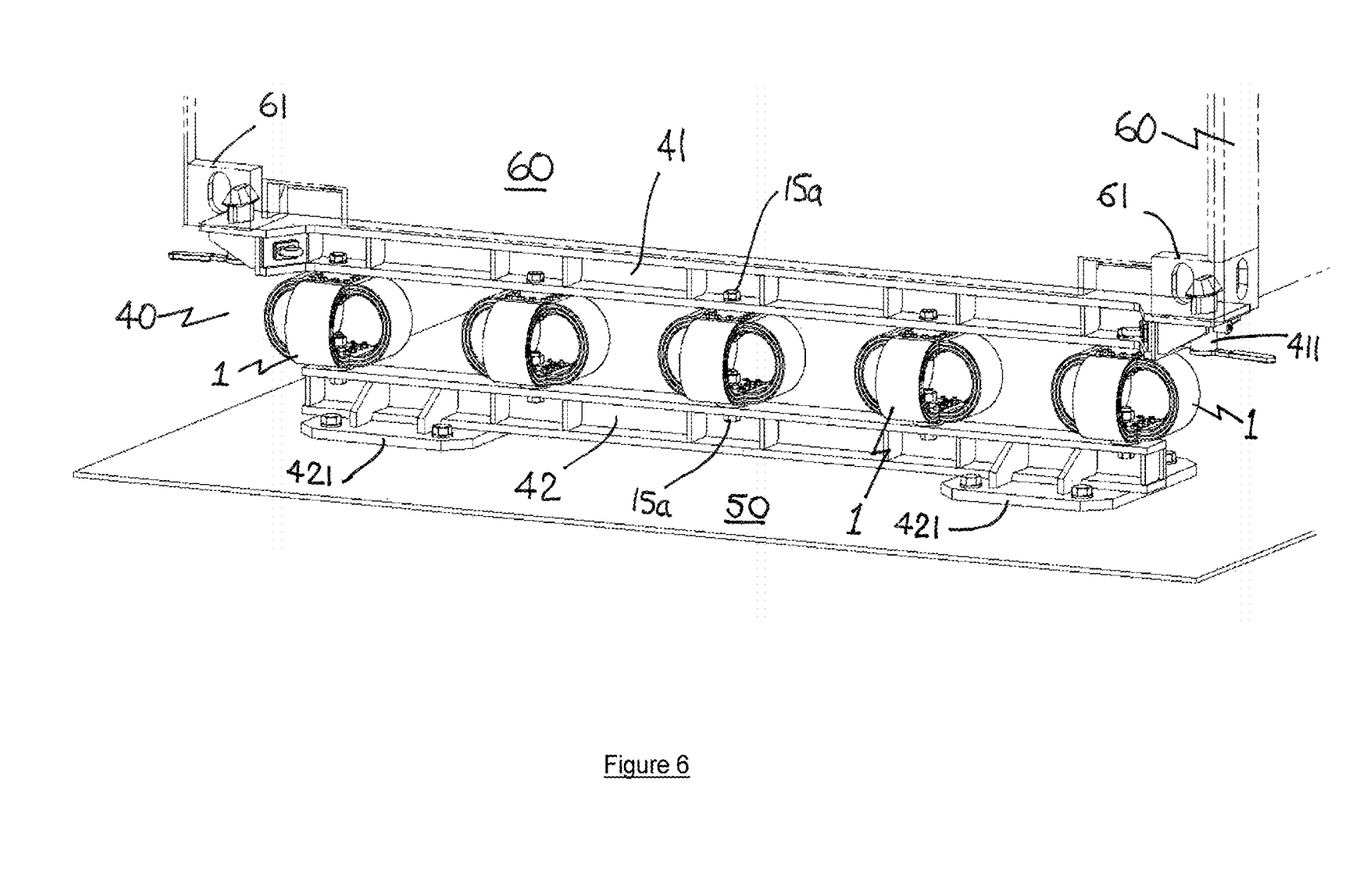
FIGS. 6 and 7 are schematic views of a mounting rail assembly in accordance with the invention.

With reference to FIG. 4, apertures 81 and 82 (FIG. 1) enables a mount 1, 10 to be secured between an item of equipment 17 to be mounted and its supporting surface (not shown). Such a supporting surface may comprise, but is not limited to, a ship's deck, a deckhead, a bulkhead, a seating, a tank top or other foundation, for example a rail of a mounting rail system 40 as shown in FIG. 6 and described below.

As shown in FIG. 4, aperture 81 (and also aperture 82, not shown) is of a diameter such that the shoulder 120 of an insert 12 can extend at least partially therein. Insert 12 is preferably made from a polymer such as nylon.

A first mount securing bolt 15 (FIG. 4) extends through aperture 81 via a stainless steel washer 13 and insert 12 located on one side of the mount 1, 10. The shank of bolt 15 extends through aperture 81 and a through a washer 9 located on the outside of the mount 1, 10 and is fastened to the item of equipment 17 to be supported (FIG. 4) or an intermediate mounting rail 41 (FIG. 6) by means of a threaded nut 15*a*. A second mount securing bolt (not shown) extends in the same manner but an opposite direction through aperture 82 (FIG. 1) and is fastened to the supporting surface substantially as described with respect to the first mount securing bolt. The mount securing bolts are fitted with their respective bolt heads located on the inside of the mount 1, 10, i.e. within the space defined generally by the leaf spring members 2. Attachment of a mount 1, 10 to an item to be supported may be affected by mounting rail arrangement 40 described below with respect to FIG. 6.

The shoulders 120 of inserts 12 prevent the metal leafs 2*a*, 3*b*, 2*c* of the leaf spring members 2 from making direct contact with the first and second mount securing bolts. Washer 9 is preferably made from a polymer such as nylon.

In accordance with the invention, mounts 1, 10 are further provided with means to protect the mount securing bolts in the event of mount bottoming, i.e. over-closure of the mount in compression, whereby large displacement motions of the item being supported and/or the supporting surface can cause the mount to compress to the extent that the heads of the mount securing bolts clash together. With reference to FIG. 4, the means to protect the mount securing bolts comprises a cap 16 formed from a resilient material, preferably rubber and not more than 60 shore hardness, that is adapted to be fitted over the respective mounting bolt 15 heads. Cap 16 is formed having side walls 16*a* adapted to engage with the bolt 15 head, and a bulbous dome 16*b* which defines an air gap 16*c* between the dome 16 and the bolt head 15 in use, the air gap allowing for deformation of the cap before the cap material stiffens as it is compressed in use. In this way, cap 16 is a bump stop. Additional securing of cap 16 to the bolt head is affected by means of a spring hose clip 18 positioned around the cap side walls 16*a* in use. While bottoming forces of an over-closed mount 1, 10 are unavoidable, caps 16 reduces the high frequency accelerations transmitted above mount which would otherwise ensue from the metal-to-metal contact of clashing bolt heads.

Figure 5:
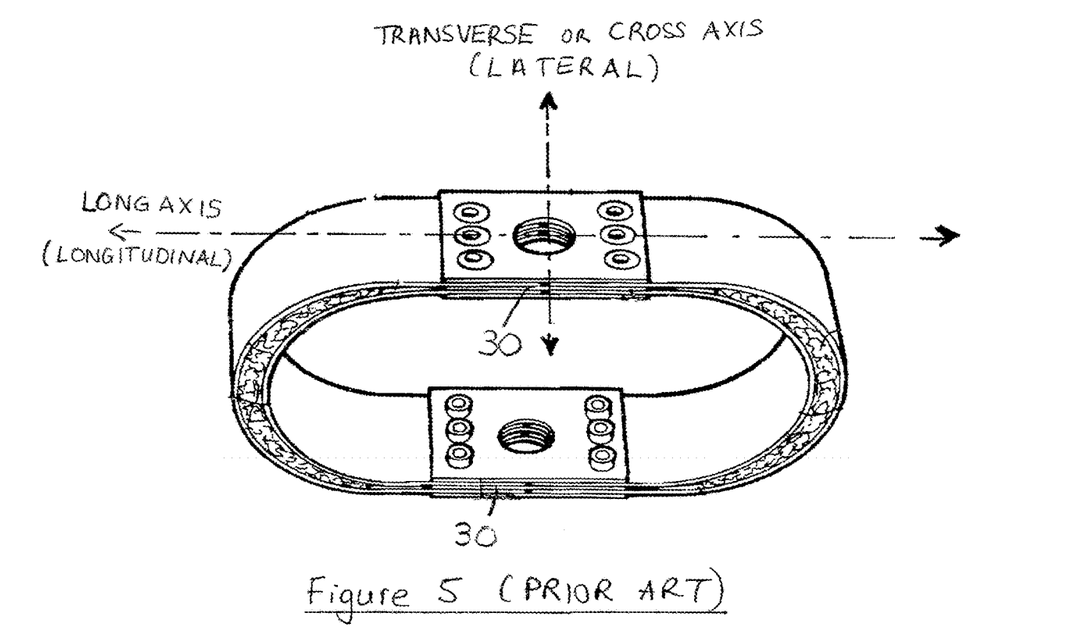
FIG. 5 shows an "X-type" mount of the prior art.

Mounts of the present invention provide a number of advantages over the "X type" mounts of the prior art as shown by way of example in FIG. 5. Firstly, the supported mass range is increased over the known "X type" mounts.

For example, a mount 1 in accordance with the invention having four substantially U-shaped leaf spring members 2 that are each equivalent to a leaf spring member of a 450 kg specification "X type" mount of the prior art has been tested and shown to be able to support a mass of 1250 kg.

This has been achieved in a physical mount 1 having a footprint which is only slightly greater than an original single 450 kg "X type" mount, and is the same overall height as the original 450 kg "X type" mount.

In addition, the cross axis and transverse characteristics of the mounts 1, 10 of the present invention are improved over the prior art mounts.

This is because a mount 1 of the present invention having four substantially U-shaped leaf spring members 2 produce a symmetric lateral static stiffness, lateral natural frequency and dynamic characteristics which remove the asymmetry that is present in the prior art "X type" mount designs. This is the case no matter which way the mount 1 is oriented.

Furthermore, mounts 10 of the present invention having three substantially U-shaped leaf spring members 2 provide significantly improved asymmetric lateral static stiffness compared to the asymmetry that is present in the prior art "X type" mount designs.

In practice, the asymmetry that is present in the prior art "X type" mount designs means that where equal stiffness and/or damping is required in both lateral and longitudinal directions (as indicated in FIG. 5), a number of separate prior art "X type" mounts are required to be used between an object to be supported and the underlying support surface. This is problematic as the only way in which a total symmetric arrangement can be achieved in terms of lateral stiffness is by alternating a number prior art "X type" mounts about their long axes and cross axes. Such an alternating arrangement of prior art mounts imposes a large space penalty to fit such mounts within the footprint of the item of equipment to be supported.

In contrast, a single mount of the present invention can produce at least the same effect as two prior art "X type" mounts arranged in alternating axial configuration, but does so within a significantly reduced footprint.

Furthermore, the impact of very high shock levels where over compression of the mount is a possibility to cause bottoming is also reduced in the mounts in accordance with the present invention.

Figure 7:
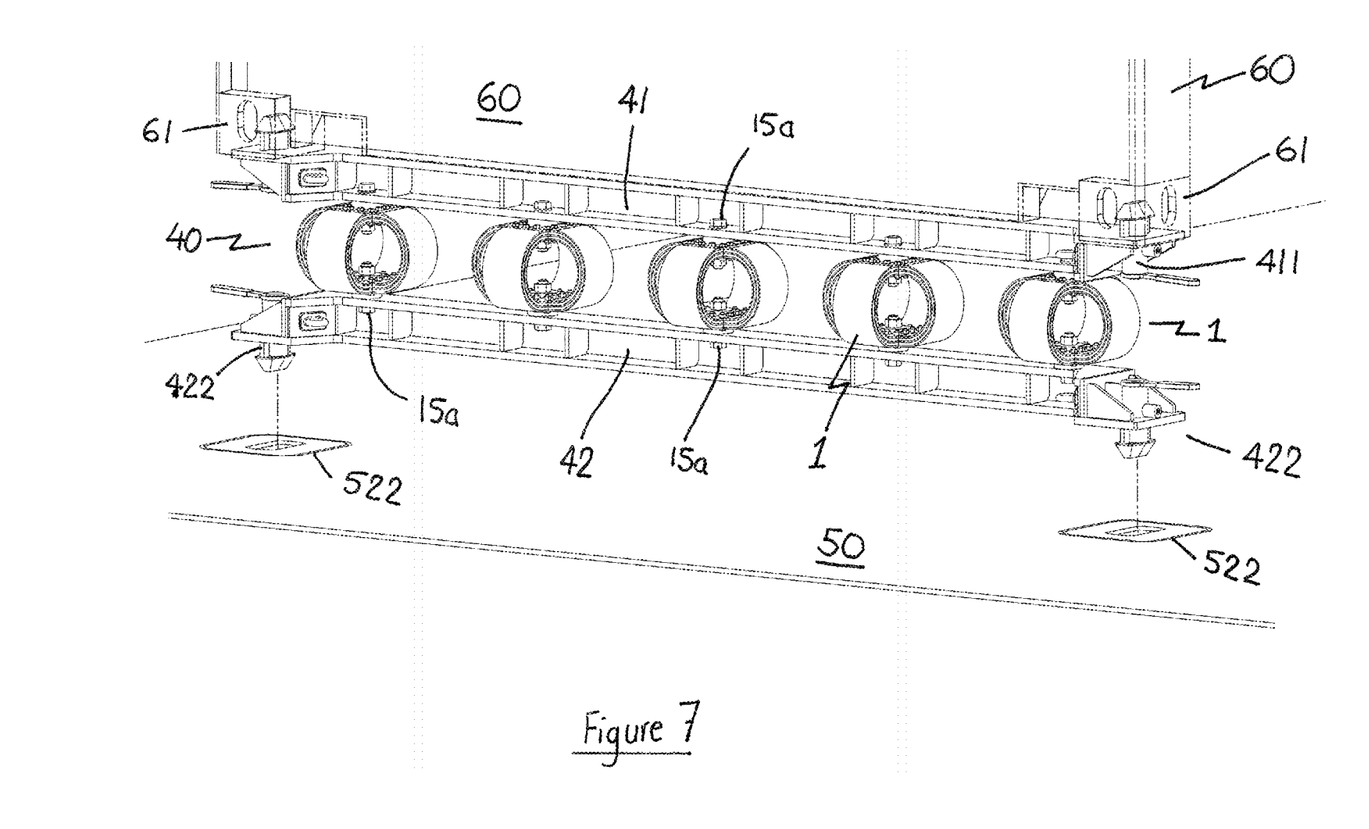

Referring to FIGS. 6 and 7, there is shown a mount assembly 40 in accordance with the invention comprising a plurality of mounts 1, 10 in accordance with the invention which are arranged between spaced apart mount rails 41, 42. Mount rail 41 is an upper rail and mount rail 42 is a lower rail. The mounting rail arrangement 40 is particularly adapted to support intermodal or ISO containers, containerised items or apparatuses comprising ISO castings adapted to receive twistlocks.

Each rail 41, 42 comprises a welded steel transverse beam to which the mounts 1 are attached at their respective upper and lower ends by means of mount securing bolts 15 and threaded nuts 15*a*. At each end of lower mount rail 42 there is provided a means of fixing said rail to the deck of a vessel or vehicle or other supporting surface.

As shown in FIG. 6, in one possible arrangement, the lower mount rail 42 may comprise two interface pads 421, a being disposed at each end of said mount rail and which are adapted to bolt to supporting surface, for example, but not limited to, the deck 50 of a vessel or vehicle. It will be appreciated that the interface pads 421 may be fixed directly to the deck of a vessel or vehicle, or may be fixed via intermediate structure or structures located between the interface pads and the deck, for example, but not limited to, pillars which elevate the mount assembly above the surface of the deck of the vessel or vehicle.

In the variation shown in FIG. 7, the lower mount rail is provided at each end with a twistlock 422 adapted to engage with a respective complementary aperture 522, for example of an ISO casting, provided on a supporting surface. In this way the mount assembly 40 can easily be releasably engaged and disengaged from both object to be supported, and the supporting surface.

The upper mount rail 41 spans the entire width of the assembly 40 and is provided at each end with a twistlock 411. Each twistlock 411 is adapted to engage with a complementary casting 61 provided on the item to be supported, for example the corner castings 61 of an ISO container 60 as shown in FIG. 6. In this way, the container 60 is supported by the mounts 1, 10. The only contact between the supported item and the upper mount rail 41 is between the twistlock units 411 and the ISO castings 61.

In use, the mount rails 41, 42 are assembled with the mounts 1, 10 and the complete assembly 40 is moved into position where it is bolted to the deck 50 of the ship, boat or vessel. Respective rail and mount assemblies 40 are fixed to the deck 50 at a suitable spacing which corresponds to the length of the ISO complaint item to be supported. The supported item, for example an ISO container, is then lifted onto the twistlocks 411 and is secured in the conventional manner by engaging said twistlocks. The twistlocks 411 provided on mount rail 41 may either be manual, automatic or semi-automatic type, depending on the particular application or operational requirements.

The mount rails 41, 42 are designed such that no part of them protrudes beyond the footprint defined by the supported item. Thus, separately mounted units can be placed side-by-side and end to end without their respective mount rails interfering with one another. In cases where supported items are placed side-by-side or end-to-end the supported items may be linked and secured together to ensure that they move together in phase, thereby removing the risk of the items clashing under shock motion.

Mount rail and mount assemblies as described above have been tested with 12500 kg supported mass contained within a standard 20 feet (ft) ISO container unit and have been found to have assured captivity at high shock levels and a reduction in shock accelerations to between 10 g and 30 g (g being the acceleration of gravity) depending on the input levels applied.

The invention claimed is:

1. A mount comprising at least three substantially U-shaped leaf spring members, each leaf spring member comprising at least two leafs arranged to define a space therebetween, wherein each substantially U-shaped leaf spring member has an upper and a lower end, the upper and lower ends representing respective terminal ends of each leaf of each leaf spring member, and wherein the respective terminal ends of each leaf of adjacent leaf spring members are interleaved relative to each other;

wherein the space defined by adjacent leafs of the leaf spring members is filled with a damping material;

wherein each leaf spring member has a recessed portion at each of its respective terminal ends, the respective recessed portions being configured such that when the leaf spring members are interleaved, the respective recessed portions come into proximity with each other to define apertures at the top and bottom of the mount; and wherein the mount further comprises inserts, each having a shoulder that is adapted to extend at least partially into a respective aperture at the top and bottom of the mount, the inserts being adapted to receive the shanks of mount securing bolts which extend through the respective apertures at the top and bottom of the mount.

2. The mount of claim 1, wherein the respective at least three substantially U-shaped leaf spring members are arranged in an array having a substantially equal angular spacing between adjacent spring members.

3. The mount of claim 2, wherein the at least three adjacent substantially U-shaped leaf spring members are separated by an angle that is substantially 360°/n, where n is a whole number greater than or equal to three.

4. The mount of claim 1, wherein the mount comprises three substantially U-shaped leaf spring members.

5. The mount claim 1, wherein the mount comprises four substantially U-shaped leaf spring members.

6. The mount of claim 1, wherein each leaf spring member comprises two leafs arranged to define a space therebetween.

7. The mount of claim 1, wherein each leaf spring member comprises three leafs arranged to define a space therebetween.

8. The mount of claim 1, wherein each leaf is formed from a band of stainless steel.

9. The mount of claim 1, wherein the damping material comprises a viscoelastic damping compound.

10. The mount of claim 1, wherein the damping material comprises a wire mesh.

11. The mount of claim 9, wherein the damping material comprises a wire mesh.

12. The mount of claim 1, wherein the respective interleaved leafs are connected together via bolts which engage with locking nuts which extend through closure plates provided at either side of the respective upper and lower ends of said leaf spring members.

13. The mount of claim 1, wherein the apertures defined by the respective recessed portions are substantially concentric.

14. The mount of claim 1, wherein each of the closure plates each has a corresponding aperture that is in coaxial alignment with the apertures at the top and bottom of the mount.

15. The mount of claim 1, wherein the inserts are made from comprise nylon.

16. The mount of claim 1, wherein the mount further comprises one or more caps formed from a resilient material that is/are adapted to be fitted over the head/heads of the mounting bolt(s), wherein the one or more caps are adapted to protect the mount securing bolts in the event of mount bottoming.

17. The mount of claim 16, wherein each cap is formed from rubber of not more than 60 shore hardness.

18. The mount of claim 16, wherein each cap has side walls adapted to engage with the head of a corresponding mount securing bolt, and a bulbous dome which defines an air gap between the dome and the head of the corresponding bolt.

19. A mount assembly comprising a plurality of mounts according to claim 1, wherein the mounts are arranged between spaced apart upper and lower mount rails.

20. The mount assembly according to claim 19, wherein each mount rail comprises a welded steel transverse beam to which the mounts are attached at their respective upper and lower ends by mount securing bolts and threaded nuts.

21. The mount assembly according to claim 19, wherein the lower mount rail comprises one or more interface pads which are disposed at each end of said mount rail and which are adapted to bolt to a supporting surface.

22. The mount assembly according to claim 19, wherein the lower mount rail comprises twistlocks which are disposed at each end of said mount rail and which are adapted to fasten to a complementary aperture provided on a supporting surface.

23. The mount assembly according to claim 19, wherein the upper mount rail spans a width of the mounting rail assembly and has a twistlock at each end.

\* \* \* \* \*